United States Patent [19]
Bondy et al.

[11] Patent Number: 5,491,813
[45] Date of Patent: Feb. 13, 1996

[54] DISPLAY SUBSYSTEM ARCHITECTURE FOR BINDING DEVICE INDEPENDENT DRIVERS TOGETHER INTO A BOUND DRIVER FOR CONTROLLING A PARTICULAR DISPLAY DEVICE

[75] Inventors: Gregory L. Bondy; John A. Cook; Richard L. Verburg, all of Austin, Tex.

[73] Assignee: International Business Machines Corporation, Armonk, N.Y.

[21] Appl. No.: 341,858

[22] Filed: Nov. 18, 1994

Related U.S. Application Data

[63] Continuation of Ser. No. 823, Jan. 4, 1993, abandoned, which is a continuation of Ser. No. 478,384, Feb. 12, 1990, abandoned.

[51] Int. Cl.$^6$ .................................................. G06F 3/14
[52] U.S. Cl. .................................. 395/500; 395/162
[58] Field of Search ..................... 395/500, 162, 395/163

[56] References Cited

U.S. PATENT DOCUMENTS

| | | | |
|---|---|---|---|
| 4,589,063 | 5/1986 | Shah et al. | 364/200 |
| 4,649,479 | 3/1987 | Advani et al. | 395/700 |
| 4,672,532 | 6/1987 | Jonge Vos | 364/200 |
| 4,697,232 | 9/1987 | Brunelle et al. | 364/200 |
| 4,779,187 | 10/1988 | Letwin | 364/200 |
| 4,825,358 | 4/1989 | Letwin | 364/200 |
| 4,835,685 | 5/1989 | Kun | 364/200 |
| 4,903,218 | 2/1990 | Longo et al. | 395/163 |
| 5,065,343 | 11/1991 | Inoue | 395/162 |
| 5,083,262 | 1/1992 | Haff, Jr. | 395/500 |

FOREIGN PATENT DOCUMENTS 0336552  2/1989  European Pat. Off. .

OTHER PUBLICATIONS

*Mini Micro Systems,* vol. 17, No. 9, Jul. 1984, Boston US, "Graphics Software Schemes Enhance Peripheral Interfacing", Carl Warren, pp. 163–178.

IBM Technical Disclosure Bulletin, vol. 28, No. 2, Jul. 1985, p. 617, N. L. Springen, "Method to Dynamically Bind Device Drivers".

*Hewlett–Packard Journal,* vol. 40, No. 5, Oct. 1989, Palo Alto US, "A Model for HP–UX Shared Libraries Using Shared Memory on HP Precision Architecture Computers", A. M. Martelli et al, pp. 86–90.

*Primary Examiner*—William M. Treat
*Assistant Examiner*—Richard L. Ellis
*Attorney, Agent, or Firm*—Mark E. McBurney; Diana L. Roberts

[57] ABSTRACT

A programming interface is provided in a computer graphics system which allows plural hardware display adapters to be upgraded and enhanced without correspondingly upgrading and rewriting display specific device driver code for each separate program application using the graphics system. A resource library with a standard programming interface, but specific to each display adapter is included, as well as display driver code for each adapter. Functions necessary to service the graphics model embodied in the program application are configured as device driver models and also are included within the interface of the present invention. Initially, the functions provided in the resource library are dynamically bound to expose the functionality of the desired display adapter. A second level of dynamic binding is implemented to bind the program application with the display specific code and graphic models being utilized. In this manner, numerous combinations of program applications and display adapters can be used without providing an interface for each possible combination.

20 Claims, 6 Drawing Sheets

FIG. 1

PRIOR ART

| adapter | model | object file name |
|---|---|---|
| 1 | 0 | /usr/lpp/gai/adapter1/rms.o |
| 1 | 1 | /usr/lpp/gai/adapter1/2d.o |
| 1 | 2 | /usr/lpp/gai/adapter1/3dm1.o |
| 1 | 3 | /usr/lpp/gai/adapter1/3dm2.o |
| 2 | 0 | /usr/lpp/gai/adapter2/rms.o |
| 2 | 1 | /usr/lpp/gai/adapter2/2d.o |
| 2 | 2 | /usr/lpp/gai/adapter2/3dm1.o |
| 2 | 3 | /usr/lpp/gai/adapter2/3dm2.o |
| 3 | 0 | /usr/lpp/gai/adapter3/rms.o |
| 3 | 1 | /usr/lpp/gai/adapter3/2d.o |
| 3 | 2 | <empty> |
| 3 | 3 | <empty> |
| 4 | 0 | /usr/lpp/gai/adapter4/rms.o |
| 4 | 1 | /usr/lpp/gai/adapter4/2d.o |
| 4 | 2 | <empty> |
| 4 | 3 | <empty> |
| ⋮ | ⋮ | ⋮ |

DISPLAY SUBSYSTEM ARCHITECTURE FOR BINDING DEVICE INDEPENDENT DRIVERS TOGETHER INTO A BOUND DRIVER FOR CONTROLLING A PARTICULAR DISPLAY DEVICE

This is a continuation of application Ser. No. 08/000,823 filed Jan. 4, 1993, now abandoned which is a continuation of application Ser. No. 07/478,384 filed Feb. 12, 1990, now abandoned.

BACKGROUND OF THE INVENTION

This invention relates generally to a display subsystem architecture for use in a computer graphics environment. In particular, the present invention provides a programming interface layer between the display subsystem portion of an operating system and the specific display adapters being utilized. The programming interface combines a number of device independent graphics models and device dependent display drivers such that the hardware and software capabilities of the overall system can be optimized. This combination of graphical models and device drivers is realized through a procedure known as "dynamic binding."

Originally, one or more independent drawing routine packages, such as GSL, X-Windows, or graPHIGS (all which are products of IBM Corp.) were utilized on the display subsystem. The packages tended to operate in a space sharing and time sharing mode in which each package utilized the full screen and in which the time sharing was controlled by commands input from the user. There was no sharing of the screen by two packages.

If more than one type of display adapter could be installed on the display subsystem, each independent drawing routine package would support its own device dependent control of the display adapter. The different types of display adapters would generally have unique means of entering hardware commands and unique means of representation of graphical data.

The independent graphics routine packages each maintained their own "model" of graphics. The method of passing data and commands and the functionality of the programming interface to the routines were unique to each model. The uniqueness of the model determined pronounced differences between the ways the packages would implement device dependent control of the specific display adapters.

A specific prior art graphics package provides an application interface (API) with several device drivers which are incorporated therein and associated with a specific display adapter. These device drivers are dependent upon the type of display adapter being utilized. Additionally, every package present must have a display driver for each display adapter present. Therefore, a problem arises when it is desired to change a display adapter, or add an additional display adapter, since the device drivers are actually contained within the independent graphics routine packages and each package would have to be updated with the new device driver code. Another problem arises in that there is a need to construct a number of device drivers equal to the product of the number of packages times the number of types of devices.

Prior art systems are limited in that for each new or updated device, each of the graphics packages present must also be changed. This requirement forces a software vendor to rewrite the code contained in the graphics package for each new or enhanced device. Alternatively, the vendor must teach a software user to rewrite the code, which may cause problems with regard to proprietary and confidential information. Another problem with the prior art system exists in that any new functionality, provided by added devices (display adapters), is limited to the installed graphics model. For example, if an enhanced type of display adapter was added to a prior art system using a GSL graphics model, the user would not be able to use the new features except as permitted by GSL.

Figure 1:
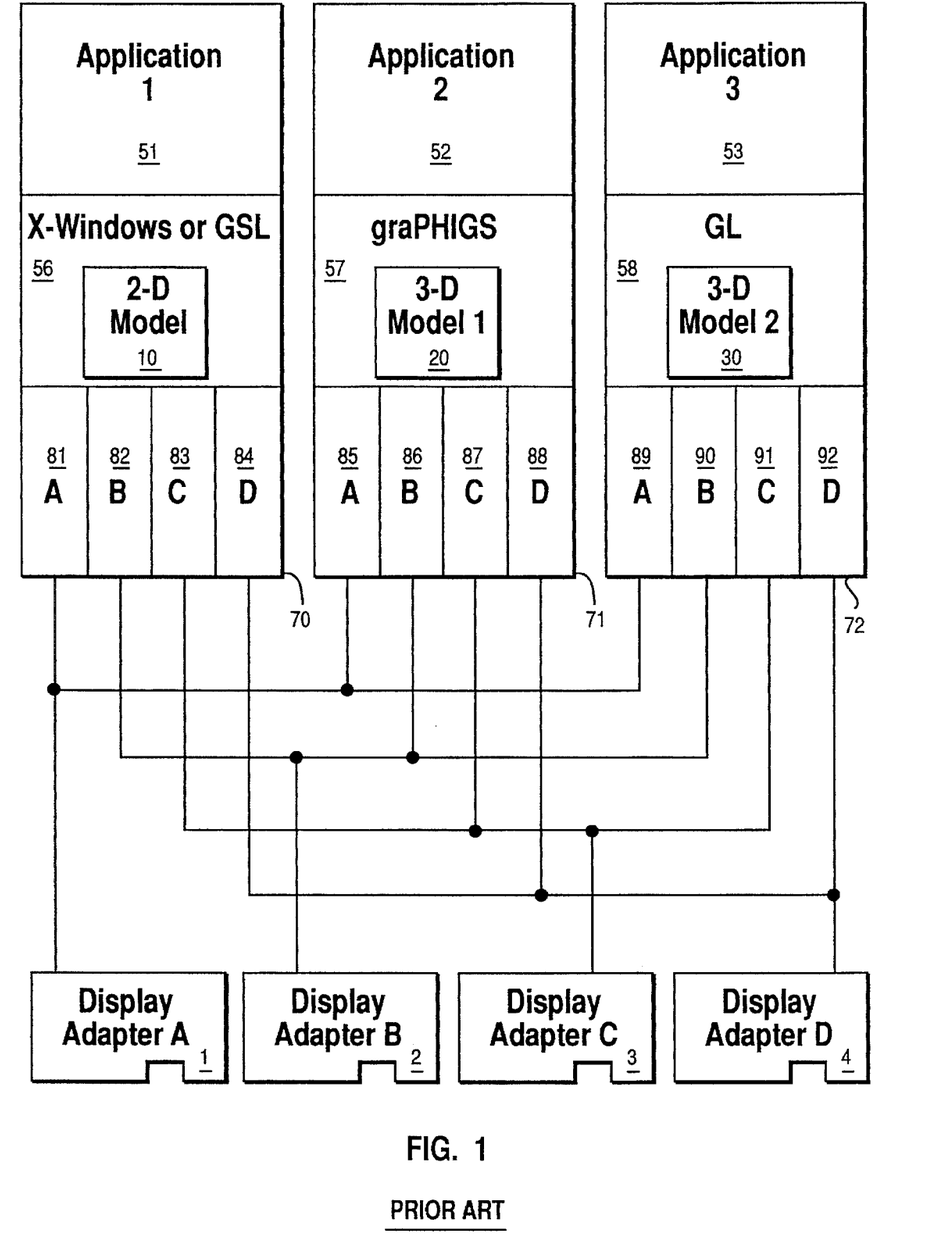
FIG. 1 is a block diagram representing a prior art graphics display subsystem.

Referring to FIG. 1, a prior art graphics application programming interface system is shown. Three separate application programs 51, 52, 53 are present. Application 51 is two-dimensional (2D), whereas applications 52 and 53 correspond to first and second three-dimensional (3D) applications. Next, a set of graphics packages 56, 57, 58, embodying models 10, 20, 30 are shown, each supporting applications 51, 52, 53, respectively. These packages provide a programming interface between a program application and display dependent device driver sets 70, 71, 72 as discussed in more detail below with reference to the present invention. It can be seen from FIG. 1 that each graphics package 56, 57, 58 includes a device driver set 70, 71, or 72, which must contain code that is dependent upon each display adapter present.

The programming interfaces to device driver sets 70, 71, and 72 are not necessarily the same, and there is not any particular requirement that all of the device dependent sections within a device driver have the same programming interface. In this example, display adapters 1, 2, 3, 4 are provided with corresponding dependent display driver code 81, 82, 83, 84, 85, 86, 87, 88, 89, 90, 91, and 92.

Therefore, the redundancy of the prior art system of FIG. 1 is apparent. That is, each device driver set 70, 71, 72 must contain code specifically written for each display adapter present. Thus, device driver set 70 includes four sets of code 81, 82, 83, and 84; device driver set 71 includes four sets of code 85, 86, 87, and 88; and, device driver set 72 includes four sets of code 89, 90, 91, and 92. There are twelve sets of code in all, which is the product of the three models times the four types of display adapters.

It can be seen that by adding or altering (by upgrading, or the like) any of the display adapters 1, 2, 3, 4, the corresponding device driver code 81, 82, 83, 84, 85, 86, 87, 88, 89, 90, 91, and 92 (contained in device driver sets 70, 71, 72) must also be altered. Consequently, if display adapter 4 (for example), were upgraded, then graphics package 56, 57, 58 would also need to be updated such that the display driver specific code 84, 88, and 92 would correspond to the upgraded adapter 4. The desirability of eliminating this redundancy, in order to improve efficiency, is readily apparent.

Therefore, it can be seen that there is a need for a graphics interface which provides flexibility between the graphics applications and the display adapters. It would also be advantageous to provide an interface which allows multiple graphics models to operate in conjunction with a plurality of device dependent drivers such that the full capability of the graphics models and display adapters can be exploited, without experiencing the redundancy problems present in the prior art.

SUMMARY OF THE INVENTION

In contrast to the prior art, the present invention is a device driver programming interface which includes a number of graphics models capable of running a plurality of independent drawing routine packages. For example, the previously mentioned GSL graphics package and X-Windows are two-dimensional products, which embody a two, dimensional model of graphical operation. Therefore, a two-dimensional device driver graphics model 10 has been provided (FIG. 2) which can service these graphics packages (depicted by reference numeral 56 in FIG. 2). The package 58, known as GL, is a 3D product from Silicon Graphics, Inc. and graPHIGS 57 is a 3D product offered by IBM Corp. Each of these 3D products can be used effectively with a display system, due to the programming interface of the present invention, and each are representative of the types of 3D applications corresponding to applications 53 and 52, respectively. Similarly, any other two-dimensional or three-dimensional models can be provided to handle 2D or 3D packages. Device driver models 20 and 30, service the packages 57 and 58, respectively.

Each of the graphics models utilizes certain resources, such as a color map, window resource, display adapter, font, and the like. These resources are managed in a resource management services (RMS) device driver library in the programming interface of the present invention. It must be noted that the resources managed for each display adapter will vary depending upon the hardware features of the display adapter being used. The RMS device driver also provides abstract features, particularly a model resource. Different graphics packages 56, 57, 58 utilize the model resource to bind the package to the correct device driver library. The present invention also includes a plurality of display drivers, corresponding to the display adapters used by the system, thus eliminating the problem of having identical device driver code contained in each model.

The programming interface of the present invention is able to reconfigure itself by dynamically binding the desired graphics package with the required RMS features and device specific model instance driver for the display adapter being used. This process of dynamic binding uses a database or equivalent tabular representation to: (1) locate the specific graphics model desired; (2) retrieve this model; and (3) bind the model to the (a) device driver code for the specific display adapter being utilized, and (b) the RMS function required by the particular graphics model. The present invention utilizes two levels of dynamic binding, the first being within the RMS. That is, the device driver code necessary to provide the color resource, font, adapter resource, and the like, required for the specific graphics model, is dynamically bound. Thus, the RMS functions present are independent from the graphics model being used. As previously noted, the second level of dynamic binding occurs between the dynamically bound RMS, the desired graphics package and the device specific model corresponding to the display adapter being utilized.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 2:
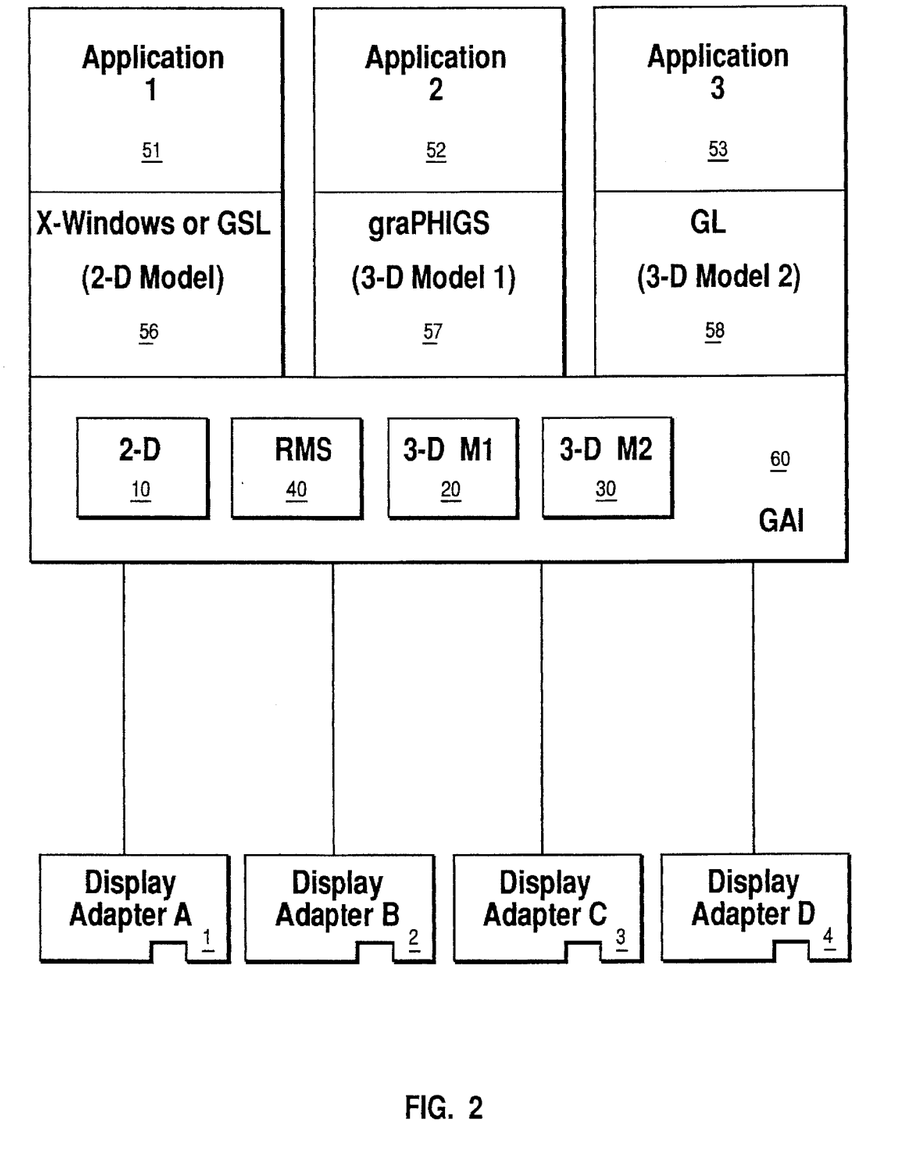
FIG. 2 is a block diagram illustrating a graphics display system including the programming interface of the present invention.

The structure of the graphics adapter interface (GAI) of the present invention will now be described with reference to FIG. 2. Applications 51, 52, 53 are shown and represent the same program applications as previously described. That is, reference numeral 51 represents a 2D application and reference numerals 52 and 53 represent first and second 3D applications. Also, display adapters 1, 2, 3, 4 are shown and represent the same components as described with regard to FIG. 1.

Applications 51, 52, 53 all utilize specific independent graphics drawing routine packages 56, 57, 58 (graphics packages, or packages) which embody different graphical models. The application programming interfaces of these packages (APIs) implement their respective graphics models by calls to the Graphics Adapter Interface (GAI) 60, which incorporates device driver programming interface (device interface) models 10, 20 and 30. The programming interface of the device drivers is constructed to match the graphical model used by the various graphics packages 56, 57, 58. The GAI device drivers take the place of the device driver interfaces 70, 71, 72, as well as the device specific code 81, 82, 83, 84, 85, 86, 87, 88, 89, 90, 91, and 92. GAI 60 provides a common interface between the packages 56, 57, 58 and display adapters 1, 2, 3, 4.

In addition to the graphics device driver models, or device interfaces, 10, 20, 30, a resource management services (RMS) library 40 is included, which is a library of routines which support the functions and characteristics, i.e. resources available on specific display adapters 1, 2, 3, 4. In addition, the RMS library 40 provides a standard means for packages to select which model of device driver will be used to implement the graphics functions. These device driver interface models 10, 20, 30 are each a library of functions, i.e., a group of related routines which correspond to and implement the specific 2D, 3D, or other functions required within a device driver by graphics packages 56, 57, 58 under control of applications 51, 52, 53. For example, the 2D model 10 is based upon the X-Windows product, whereas 3D models 30 and 20 are based upon the Silicon Graphics, Inc., GL package and the IBM graPHIGS product. Therefore, it can be seen that the interface models 10, 20, 30 included within GAI 60 are a balanced collection of functions required by the specific models of different graphics packages. The aforementioned products are only used as examples and do not exclude other such functions from the scope of the present invention.

The RMS 40 library provides the mechanism by which applications 51, 52, 53, running within independent processes, manipulate the specific display adapters 1, 2, 3, and/or 4, as is desired by the application, such that all of the available characteristics of that adapter are utilized. RMS 40 is organized on the basis of resource headers, attributes and procedures. A header contains pointers which direct an application to the attributes and procedures of a resource. A header may also contain pointers to private data and to extensions. An attribute is defined as the data description of a resource. A procedure is a function pointer that operates on a resource. The combination of resource headers, resource attributes, and resource procedures is an organization typical of those used for object-oriented programming. Functions which may be included within RMS 40 of GAI 60 may initialize, reset or update the previously noted function pointers.

Each separate display adapter 1, 2, 3, 4 may be capable of certain characteristics which enable the display adapter to provide different functions to a user program application and may vary between adapters. The RMS 40 library provides a standard device driver programming interface to expose these functions to the graphics packages. The functions are embodied as RMS resources. These functions include: (1) monitor, which enables the communication between the display adapter and a display (CRT); (2) group, the ability to have an object on a display adapter such as set of planes, but may include cursor and color maps; (3) window, information regarding application clipping information, active groups and active buffers; (4) window geometry, information regarding the size and configuration of any windows in a windowing environment; (5) cursor, information regarding a screen locator; (6) color map, which is a set of color specifications for a specified group; (7) font, which is a definition of operating system fonts (assortment of characters) in raster, vector, or outline formatted (8) model, which specifies which type of device driver interface the package requires for compatible operation with the graphics model embodied in the API; and (9) adapter, which is the highest level resource and which contains attributes and procedures used in creating and controlling the other resources.

The aforementioned resources are generally included in display adapters which are contemplated to be used in conjunction with present invention. However, other resources may be available and as such the present invention is not limited to a system having only those resources listed above.

Each of display adapters 1, 2, 3, 4 may or may not utilize the same number and types of resources, i.e. each display adapter will have its own associated RMS 40 library of function. Therefore, the resources which are capable of being exploited by a specific display adapter must be configured and bound together when this specific display adapter is utilized by a process within a program application.

In order to accomplish the configuration of display adapter specific resources within RMS 40, a method of creating a path from RMS 40 to this specific object file of the resource required is utilized. In the present invention, dynamic binding is the mechanism by which RMS 40 configures resources into a display adapter specific library of function. It should be noted that other methods of linking these resources, such as shared libraries, are contemplated by the scope of the present invention.

Dynamic binding is a means of linking all of the resource codes and model specific libraries to the independent graphics drawing routine packages. This linking is implemented by means of operating system utilities, at the time of execution of the applications 51, 52, 53 as opposed to the time of compilation of the application or of the graphics package 56, 57, 58. Dynamic binding in GAI 60 is accomplished by rules contained in the device specific RMS library 40 using data supplied in the RMS adapter resource by either the application or the API. Each display adapter 1, 2, 3, 4 will have its own set of required RMS 40 library files (see FIG. 5).

When the API desires access to the device drivers, a general GAI RMS call is invoked, to which is provided the ID of the display adapter 1, 2, 3 or 4. The ID and other parameters from the call are used to access a look up table or configuration file and find a file system path to the required resource object file. The object file of the resource is then loaded and the entry point code is executed. In this manner, the dynamic binding of the RMS library 40 is accomplished for a particular device to a particular package 56, 57, or 58 for use by its respective application 51, 52, or 53.

When the package desires additional functionality not in place in the RMS library 40, it uses the RMS model resource to specify the model of GAI device driver 10, 20, or 30 required by the API. The RMS library 40 utilizes this model data to execute a second dynamic bind, loading the device- and model-specific GAI device driver and binding it to the package. The RMS library utilizes a similar lookup table or configuration file to find the path to the required model resource object file. The object file of the model resource is then loaded and the entry point code is executed. In this manner, the second level of dynamic binding of the package to a device specific, model specific device driver is accomplished.

An example of the dynamic binding which occurs within RMS 40 will now be discussed, allowing one skilled in the art to easily comprehend how to invoke this process (see FIG. 2).

For example, assume application 51 implements a process to be displayed by a display adapter 1, onto a display such as a CRT, or like (not shown). First, the package 56 would determine that display adapter 1 is required. The package 56 would dynamically bind with the RMS library 40 which supports display adapter 1. The outcome of the binding would determine which RMS library resources and functions are required by display adapter 1, and dynamically allocate these resources, e.g. the cursor resource, font resource, and color map resources as required for display adapter 1. Second, since application 51 uses a 2D package, 2D model 10 is required to support the package. The package 56 utilizes the model resource of the RMS library 40 to dynamically bind to the 2D model GAI device driver 10 (see FIG. 3) for the display adapter 1. Thus, application 51, is able to write to display adapter 1 and utilize all of the characteristics associated with that particular hardware device.

Figure 3:
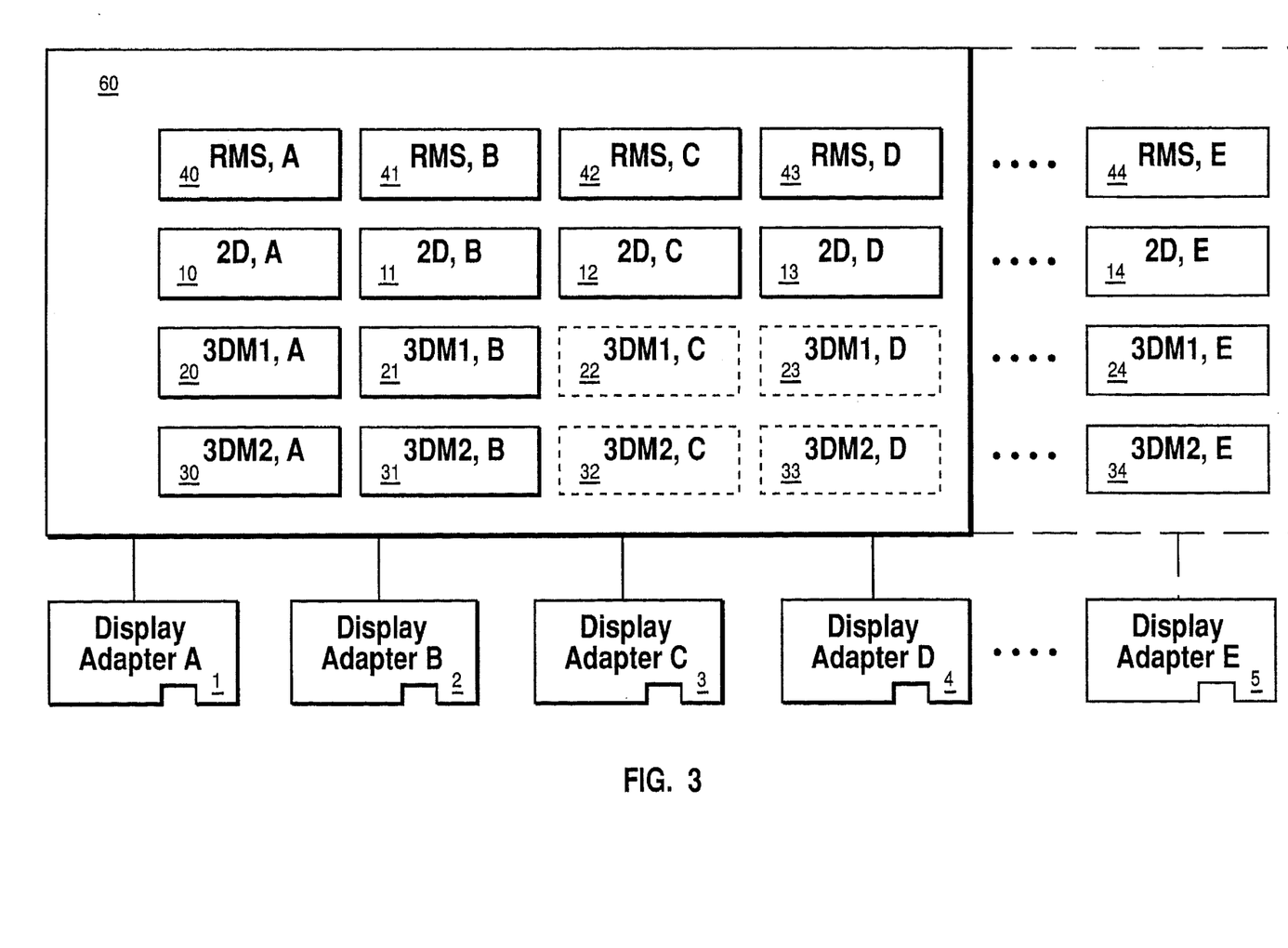
FIG. 3 is a diagram showing the components of the graphic adapter interface of the present invention and their relationship between to the display adapters.

Further, should a user of application 51 decide to write to display adapter 3, then the package 56 would repeat the dynamic bind with the RMS library, this time for a device specific instance RMS library 42 supporting display adapter 3 (the programming interface to each RMS instance is identical). The package 56 then manipulates the model resource of RMS library 42 to dynamically bind to the device specific 2D model device driver 12, which driver supports display adapter 3. The programming interface to 2D device driver 10 and 2D device driver 12 are identical, with only the device specific output of the routines varying. It can be seen how a multitude of combinations exist between applications 51, 52, 53, display adapters 1, 2, 3, 4 model specific device drivers 10–13, 20–23, and 30–33, and packages 56, 57, 58, thereby allowing each application the ability to utilize which ever display adapter characteristics are most desirable in a given situation.

Concurrent use of multiple models from within a single process works because models are stateless. Any required state information is contained within resource attributes, which are shared by all models, or passed as parameters to the procedures.

The components of GAI 60 will now be further described with reference to FIG. 3 which is a block diagram showing possible combinations of the components contained within GAI 60. The output from GAI 60 to each display adapter 1, 2, 3, 4 is shown such that the components required to be bound, for each adapter to operate with a specific graphical model (as embodied by packages 56, 57, 58), can be determined. Particular RMS libraries 40, 41, 42, 43 correspond to display adapters 1, 2, 3, 4, respectively and provide the required functions as previously discussed. Two-dimensional model specific device drivers 10, 11, 12, 13 directly relate to display adapters 1, 2, 3, 4, respectively, and specific 3D model device interfaces 20, 21, 22, 23 respectively relate to display adapters 1, 2, 3, 4. Finally, 3D model 30 includes display device driver models 30, 31, 32, 33 which also respectively relates to display adapters 1, 2, 3, 4. For each new display adapter in FIG. 3, the several device specific instances of a particular model-specific device driver library have an identical programming interface. Thus, an independent drawing routine package need only implement one device driver programming interface, to gain access to a variety of devices.

An example of the components which must be dynamically bound under given conditions will now be described with reference to FIGS. 2 and 3. Assume application 53 (FIG. 2) desires to write to display adapter 2. The package 58 loads the RMS library and is dynamically bound to RMS library 41, since display adapter 2 is being used. Because application 53 utilizes the GL package 58, and since the GL package 58 embodies the graphical model 3D-M2, then the GL package 58 uses RMS library 41 to create a model resource and uses the model resource to dynamically bind the 3D-M2 device driver 31 with the package 58. This is because model 3D-M2 includes the graphics functions required by package 58 and application 53; and, the device specific implementation of the 3D-M2 device driver for display adapter 2, shown on FIG. 3 as item 31, converts the graphics functions into the corresponding device specific function provided by adapter 2. Thus, by implementation of dynamic binding between the package 58, RMS 41 and graphics model 31, application 53 is capable of writing to display adapter 2 and utilizing all of the specific functions contained therein.

Similarly, assume application 51 (2D) desires to utilize display adapter 4. First, an initial level of dynamic binding will occur between package 56 and GAI 60 to bind the RMS library 43 to the package 56. RMS library 43 is the resource library specific to display adapter 4. Next, the second level of dynamic binding will occur between the package 56 and the 2D graphics model 13. Thus, application 51 is now able to interface with and write to display adapter 4 via the dynamically bound components within GAI 60.

It should be noted, that by way of example and not limitation, FIG. 3 shows two display adapters 3, 4 which are not capable of performing 3D operations. Thus, 3D models 22, 23, and 32, 33 are depicted, by dashed lines, as not containing any functional routines. However, this lack of function is due to a particularity of display adapters 3, 4, discussed in this example and not to GAI 60. Should enhanced or upgraded display adapters be provided for original display adapters 3, 4 then 3D models would be included within the functional capabilities of GAI 60, i.e. substituted for 22, 23 and 32, 33. Similarly, should software be written in the device driver to emulate the missing 3D functions of adapters 3 and 4, then the device drivers could be installed in place of 22, 23, 32, and 33 such that some functions would be passed to the display adapters 3 or 4 and other functions would be emulated in the device driver. It can be seen how the interchangeability and the flexibility of GAI 60 allows ease of updating, enhancing and substitution of display adapters without imposing a major reprogramming or re-linking burden on users of this computer graphics system. In the cases described above, no change would be required to any application or package.

Another function embodied in GAI 60 and depicted on FIG. 3 is the ease of addition of a new adapter into a system in which packages, applications, and display adapters already exist. For example, the individual GAI libraries which must be added to accommodate a new display adapter (e.g. display adapter 5, RMS library 44 and device drivers 34) can be written independently and without regard to each other or to which packages 56, 57, 58 will use them. Similarly, no changes at all are required to the packages or applications themselves, to use the new display adapters. This is in direct contrast to the prior art shown in FIG. 1, in which new device drivers would be required in each package to support the new device. Although a single display adapter 5 and associated RMS library 44 and device drivers 14, 24, 34 have been added in the previous example (and shown on FIG. 3), it should be understood that a virtually unlimited number of display adapters may be added, without requiring any changes to the existing components, as described above.

Figure 4:
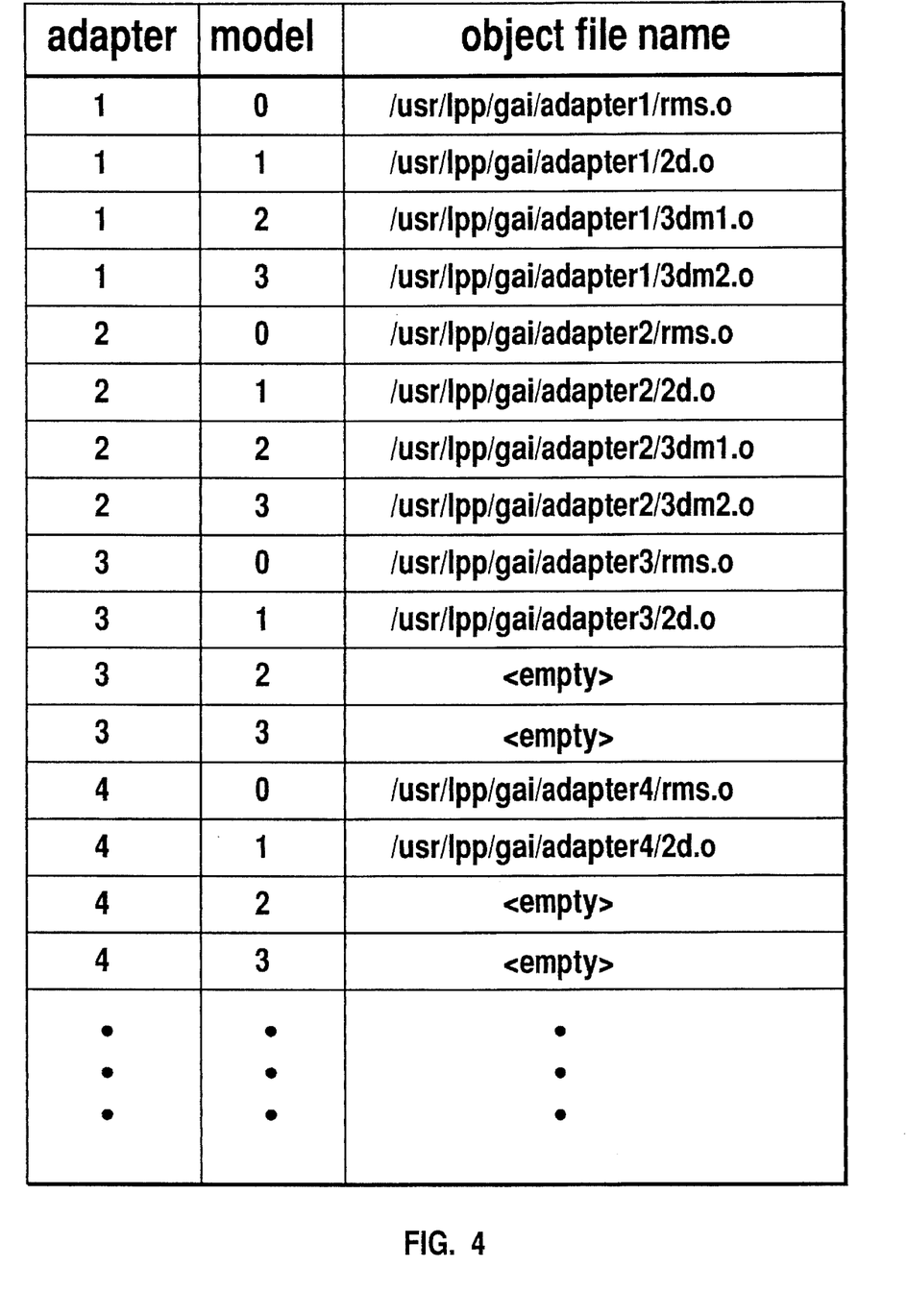
FIG. 4 is a table illustrating the means by which the present invention locates and associates the models and other components, with the display adapters during dynamic binding.

FIG. 4 illustrates a typical look up table and the commands used by the present invention to provide the dynamic binding that occurs within GAI 60. More particularly, the location and name in the file system of the operating system is stored in the table. The individual GAI instances of device specific code each are listed in the table. Additional columns associate each piece of code with the correct adapter and model. In the table, the convention of assigning value 0 to the model column denotes the RMS library; 1 denotes the 2-D model device driver programming interface; 2 denotes the 3D-M1 device driver programming interface; and, 3 denotes the 3D-M2 device driver programming interface. Note that both the adapter and the model entries must both be correctly matched in order to find the proper device specific device driver 10, 20, 30. Matching both values is accomplished by the analogous two layer dynamic bind.

The exemplary table of FIG. 4 corresponds to the components shown in FIG. 3. It can be seen that the first line corresponds to the resource management services functions (in this case RMS 40, associated with display adapter 1 and noted as adapter 1, model 0). Further, display adapter 1 is capable of displaying 2D and 3D applications and therefore includes models 2D, 3D-M1, and 3D-M2, listed as being at adapter 1, models, 1, 2, 3, respectively. Similarly, adapter 2 is capable of utilizing 2D and 3D applications and contains the same entries as does adapter 1. Of course, the adapter specific display driver code and RMS code 42 will be different for adapter 2 than they were for adapter 1.

The lack of the capability of display adapters 3 and 4 to accommodate 3D applications is apparent from FIG. 4. Only two entries are included for each of adapters 3 and 4, which are the RMS and 2D entries. Note that the absence of an entry for a particular model and particular adapter can be exposed to applications, to enable them to select which packages are suitable. Similarly, the packages themselves can examine the table and determine which graphical model support is available on the display subsystems for adapters of interest. The RMS library model resource provides a "Query Model" procedure to assist in this examination.

Figure 5:
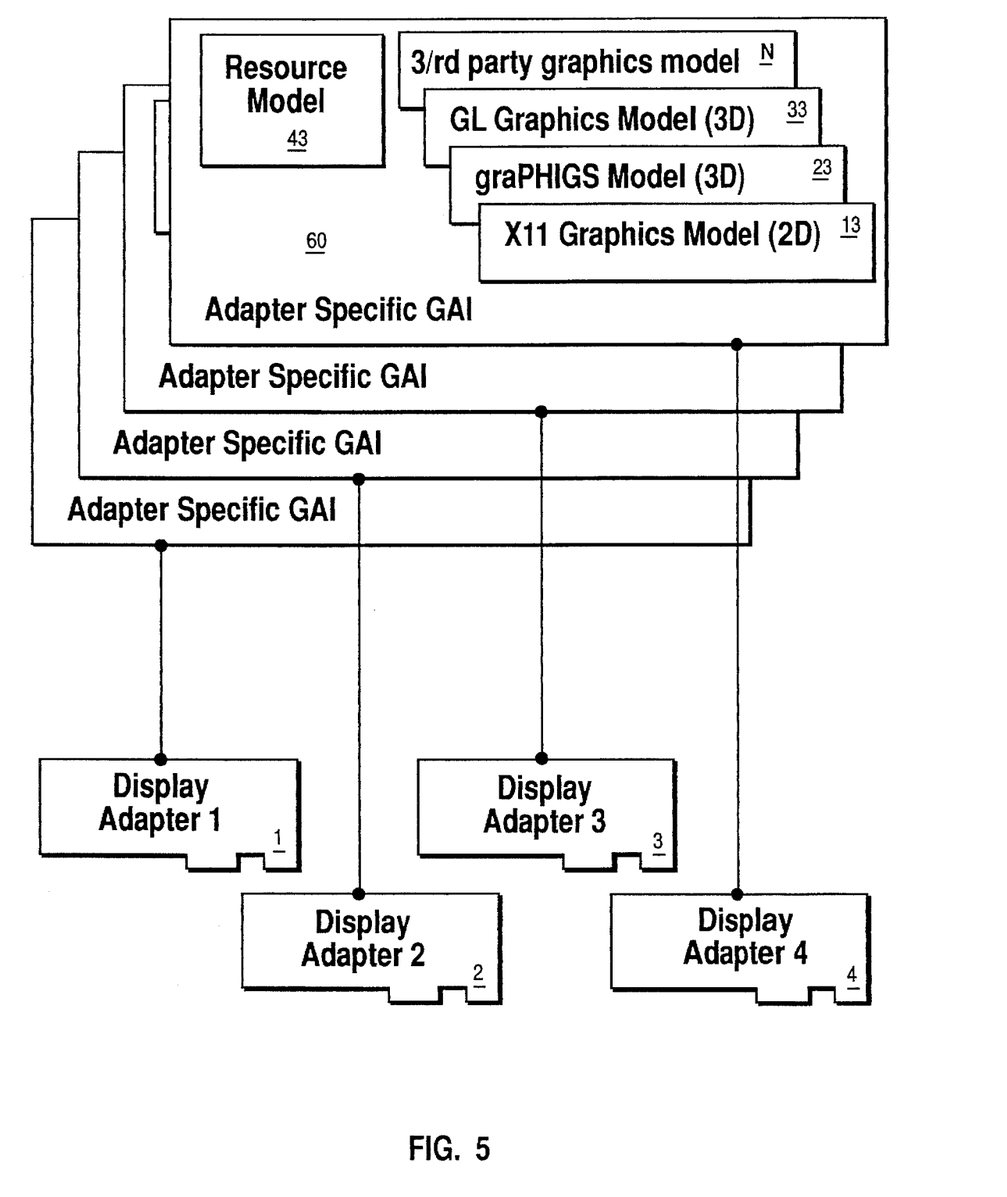
FIG. 5 is a block diagram showing the graphics adapter interface of the present invention.

FIG. 5 is a representation of the effect of the present invention in configuring the GAI with respect to each display adapter 1, 2, 3, 4. GAI 60 presents the same interface to graphics packages 56, 57, 58 for each adapter 1, 2, 3, 4 as would be accomplished if the programming interfaces shown in FIG. 5 were actually present. The present invention allows an application to change the programming interface, specific to a graphics model, which is bound to display adapter. It can be reconfigured for each display adapter by issuing a command to the RMS to destroy a model, upon which the dynamic binding previously implemented is released. The present invention then may, by subsequent dynamic binding, reconfigure GAI 60 to utilize the specific characteristics of the next display adapter or graphics model desired to be used by a program application. Also, shown in FIG. 5, is the inclusion of a third (3/rd) party graphics model N (N being equal to the next available reference numeral after the one used for the last graphics model added to the system). Rather than adding a new adapter, utilized by existing software packages, it is possible to introduce new drawing routine packages which embody a different graphical model than those shown in FIGS. 3 and 5. For such cases, a new device driver model is created, which is the equivalent of adding one new row to FIG. 3. Applications or drawing routine packages based upon the new model remain uncoupled from the requirement of including device specific code. Thus it can be seen that, by dynamically binding the components of GAI 60 a virtually unlimited number of adapters can be used in conjunction with plural graphics applications, such that the adapters can be upgraded and enhanced by performing a single installation of an object code file. Conversely, prior art systems require a new installation of an object file for each application being utilized, every time any display adapter hardware was substituted, enhanced, upgraded, or the like.

Figure 6:
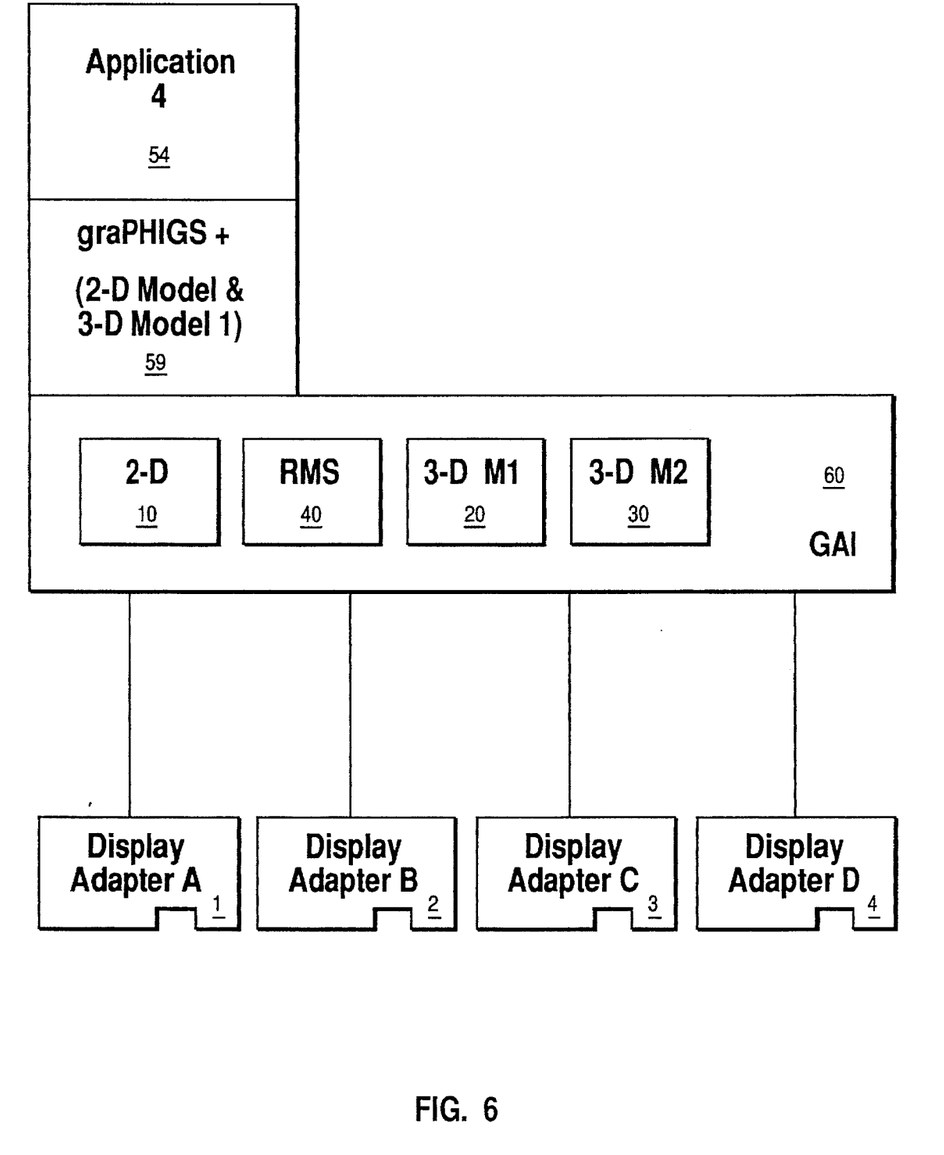
FIG. 6 is a block diagram depicting another embodiment of the present invention wherein a single graphics package is capable of providing an interface for a plurality of display adapters, or a plurality of device driver interface models.

Referring to FIG. 6, additional advantages of the GAI 60 can be seen. It is possible to introduce new graphics packages, such as graPHIGS+59 (a 3D graphics product provided by IBM Corp.), which take advantage of the abilities of GAI 60. GAI 60 has the flexibility to allow simultaneous connections to more than one device driver interface model and more than one display adapter. Thus, application 54, utilizing the programming interface of the graPHIGS+ package 59, may directly communicate with adapters 1, 2, 3 and 4 simultaneously.

The graphics package utilizes the GAI RMS 40 libraries of the specific display adapters to create model resources. These graphics packages use the model resources to bind to the display device driver graphics model 10, 20, 30 desired. Note that adapters 3 and 4, as mentioned previously in FIGS. 3 and 4, do not have hardware support for graphics model 3D-M1 and therefore do not have the corresponding device specific GAI device driver models 22 and 23 (FIG. 3) for 3D-M1. The graphics package graPHIGS+ manages this hardware dependency by instead utilizing a 2D graphics model 10 when displaying to adapters 3 and 4. From the perspective of application 54, the package graPHIGS+59 has provided the ability to draw to all four adapters. From the perspective of the graphics package graPHIGS+, the GAI 60 has provided a means of exploiting display hardware which can support 3D operations, by way of binding to GAI graphics model 20 (FIG. 6) device drivers for adapter 1 and 2. In addition, from the perspective of the graphics package graPHIGS+59, the GAI 60 has provided a means for the package to exploit display hardware which can only support 2D operations, by way of binding to GAI graphics device driver model 10 for adapters 3 and 4.

The ability of graphics packages to make choices among the graphics device driver models, and to connect to more than one model, and to connect to multiple models at the same time, on the same adapter provides substantial flexibility over the prior art. In addition to the graphics packages, the present invention allows program applications the capability of providing this flexibility, given the standardized programming interface of the GAI RMS library 40 and the other GAI graphics model device drivers contained within GAI 60.

Although certain preferred embodiments have been shown and described, it should be understood that many changes and modifications may be made therein without departing from the scope of the appended claims.

What is claimed is:

1. A computer graphics system including an interface between a plurality of program applications and a plurality of dissimilar hardware display adapters, each having specific functions, comprising:

means for storing a library of resource functions including a plurality of device drivers, each device driver not corresponding to any specific individual device, but each including multiple device driver functions to control and implement different functions specific to each of said dissimilar hardware display adapters;

a plurality of device interfaces corresponding to specific functions provided by said program applications;

first means for binding specific ones of said plurality of device drivers together with one another to form a first set of bound device drivers, said first set corresponding to a first one of said dissimilar hardware display adapters, for use by a first of said program applications;

second means for binding a first one of said device interfaces, corresponding to said first dissimilar hardware display adapter, with said first set of bound device drivers and said first program application;

means for dynamically binding other specific ones of said device drivers together with one another to form a second set of bound device drivers, and a second one of said plurality of device interfaces when a second one of said dissimilar hardware display adapters is to be written to by a second one of said program applications;

means for transferring information from any one of said program applications to any one of said dissimilar hardware display adapters when a corresponding plurality of device drivers are bound with a corresponding one of said plurality of device interfaces; and wherein said plurality of device drivers and said plurality of device interfaces are configurable to allow transfer of information from one of said program applications to any of said dissimilar hardware display adapters.

2. A system according to claim 1 wherein said second means comprises means for linking said resource functions with said device interfaces.

3. A system according to claim 1 wherein subsequent binding will provide an interface between a combination of said at least one program application and another of said hardware display adapters.

4. A system according to claim 3 further comprising a graphics package, corresponding to each of said at least of program application, containing models of graphical functions relating to said corresponding program application.

5. A system according to claim 4 wherein said graphics package, said device interface and said library of resource functions are dynamically bound.

6. A system according the claim 5 wherein said resource function comprises monitor data, group data, window data, window geometry data, cursor data, color map data, font data, model data and adapter data.

7. A system according to claim 6 wherein said dynamically bound graphics package, said device interface and said library of resource functions are configured as a single hardware display adapter interface.

8. A system according to claim 7 wherein said program application and said graphics packages determine which of said device interfaces are available for use with specific ones of said plurality of hardware display adapters.

9. A system according to claim 5 wherein said graphics package is capable of simultaneously communicating with each of said hardware display adapters.

10. A system according to claim 9 wherein said graphics package is dynamically bound to a plurality of said device interfaces.

11. A computer implemented method of interfacing between a plurality of program applications running on a computer graphics system and a plurality of dissimilar hardware display adapters contained in said system, each said adapter having specific functions, said computer implemented method comprising the steps of:

providing a library of resource functions including a plurality of device drivers, each device driver not corresponding to any specific individual device, but each having multiple device driver functions to control and implement different functions specific to each of said dissimilar hardware display adapters;

providing a plurality of device interfaces corresponding to specific functions provided by said program applications;

binding specific ones of said plurality of device drivers together with one another to form a first set, corresponding to a first one of the dissimilar hardware display adapters, for use by a first of said program applications;

binding a first one of said device interfaces, corresponding to said first hardware display adapter, with said bound first set of device drivers and said first program application;

dynamically binding other specific ones of said device drivers together with one another to form a second set, and a second one of said plurality of device interfaces when a second one of said dissimilar hardware display adapters is to be written to by a second one of said program applications;

transferring information from any one of said program applications to any one of said dissimilar hardware display adapters when a corresponding plurality of device drivers are bound with a corresponding one of said plurality of device interfaces; and wherein said plurality of device drivers and said plurality of device interfaces are configurable to allow said transfer of information from one of said program applications to any of said dissimilar hardware display adapters.

12. A method according to claim 11 wherein said step of binding said device interfaces comprises the step of linking said resource functions with said device interfaces.

13. A method according to claim 11 further comprising the step of performing subsequent binding to provide an interface between a combination of said at least one program application and another of said hardware display adapters.

14. A method according to claim 13 further comprising the step of providing a graphics package, corresponding to each of said at least one program application, containing models of graphical functions relating to said corresponding program application.

15. A method according to claim 14 further comprising the step of dynamically binding said graphics package, said device interface and said library of resource functions.

16. A method according the claim 15 wherein said step of providing a library of resource function comprises the steps of providing monitor data, group data, window data, window geometry data, cursor data, color map data, font data, model data and adapter data.

17. A method according to claim 16 wherein said step of dynamically binding configures said graphics package, said device interface and said library of resource functions as a single hardware display adapter interface.

18. A method according to claim 17 further comprising the step of determining, by one of said program application and said graphics packages which of said device interfaces are available for use with specific ones of said plurality of hardware display adapters.

19. A method according to claim 15 wherein said step of dynamically binding comprises the step of providing simultaneous communication between said graphics package and each of said hardware display adapters.

20. A method according to claim 19 wherein said step of dynamically binding comprises the step of providing dynamic binding between said graphics package and a plurality of said device interfaces.

* * * * *

UNITED STATES PATENT AND TRADEMARK OFFICE
CERTIFICATE OF CORRECTION

PATENT NO. : 5,491,813
DATED : February 13, 1996
INVENTOR(S) : Gregory L. Bondy, et al

It is certified that error appears in the above-indentified patent and that said Letters Patent is hereby corrected as shown below:

Col. 10, line 67, "least of" and insert —least one—.

Signed and Sealed this

Second Day of July, 1996

*Attest:*

BRUCE LEHMAN

*Attesting Officer*     *Commissioner of Patents and Trademarks*